(12) United States Patent
Vozhdaev et al.

(10) Patent No.: US 6,901,814 B2
(45) Date of Patent: *Jun. 7, 2005

(54) FUSELAGE PITOT-STATIC TUBE

(75) Inventors: Yevgeny Semenovich Vozhdaev, Moscow (RU); Heinz-Gerhard Kohler, Schoneck (DE); Mikhail Alekseevich Golovkin, M.D. Zhukovsky (RU); Vladimir Alekseevich Golovkin, M.D. Zhukovsky (RU); Aleksandr Aleksandrovich Nikolsky, M.D. Zhukovsky (RU); Andrei Aleksandrovich Efremov, M.D. Zhukovsky (RU); Valentin Ivanovich Guskov, Moscow (RU)

(73) Assignees: N. E. Zhukovsky, Moscow District (RU); Aeropribor Voekhod, Moscow (RU); Nord-Micro Elektronik Feinmechanik, Frankfurt am Main (DE)

( * ) Notice: Subject to any disclaimer, the term of this patent is extended or adjusted under 35 U.S.C. 154(b) by 26 days.

This patent is subject to a terminal disclaimer.

(21) Appl. No.: 10/448,811

(22) Filed: May 30, 2003

(65) Prior Publication Data

US 2004/0007080 A1 Jan. 15, 2004

Related U.S. Application Data

(63) Continuation of application No. 09/355,409, filed as application No. PCT/EP97/05156 on Sep. 9, 1997, now Pat. No. 6,588,285.

(30) Foreign Application Priority Data

Jan. 28, 1997 (RU) ............................................ 97101306

(51) Int. Cl.$^7$ .................................................. G01F 1/46
(52) U.S. Cl. .................................. 73/861.65; 73/170.02
(58) Field of Search ........................ 73/861.65, 861.68, 73/170.02, 182, 388; 374/138, 141, 143

(56) References Cited

U.S. PATENT DOCUMENTS

| | | | | |
|---|---|---|---|---|
| 3,329,016 A | * | 7/1967 | Leavens et al. | 73/182 |
| 4,240,598 A | * | 12/1980 | Vinas Espin et al. | 244/35 R |
| 4,718,273 A | * | 1/1988 | McCormack | 73/180 |
| 4,920,808 A | * | 5/1990 | Sommer | 73/861.42 |
| 5,024,396 A | * | 6/1991 | Guevel et al. | 244/35 R |
| 5,337,602 A | * | 8/1994 | Gibson | 73/182 |
| 5,601,254 A | * | 2/1997 | Ortiz et al. | 244/1 R |
| 5,628,565 A | * | 5/1997 | Hagen et al. | 374/143 |

* cited by examiner

Primary Examiner—Harshad Patel
(74) Attorney, Agent, or Firm—Stephen B. Salai, Esq.; Brian B. Shaw, Esq.; Harter, Secrest & Emery LLP

(57) ABSTRACT

Since, as a rule, there are several such PSTs on an aircraft, this results in a marked reduction in weight and aerodynamic drag, and savings in the required electric power in conjunction with a simultaneous increase in the accuracy of measurement of the angle of attack. All this permits a substantial increase in the competitiveness of the proposed fuselage Pitot-static tube.

15 Claims, 15 Drawing Sheets

Variant 1

Variant 2

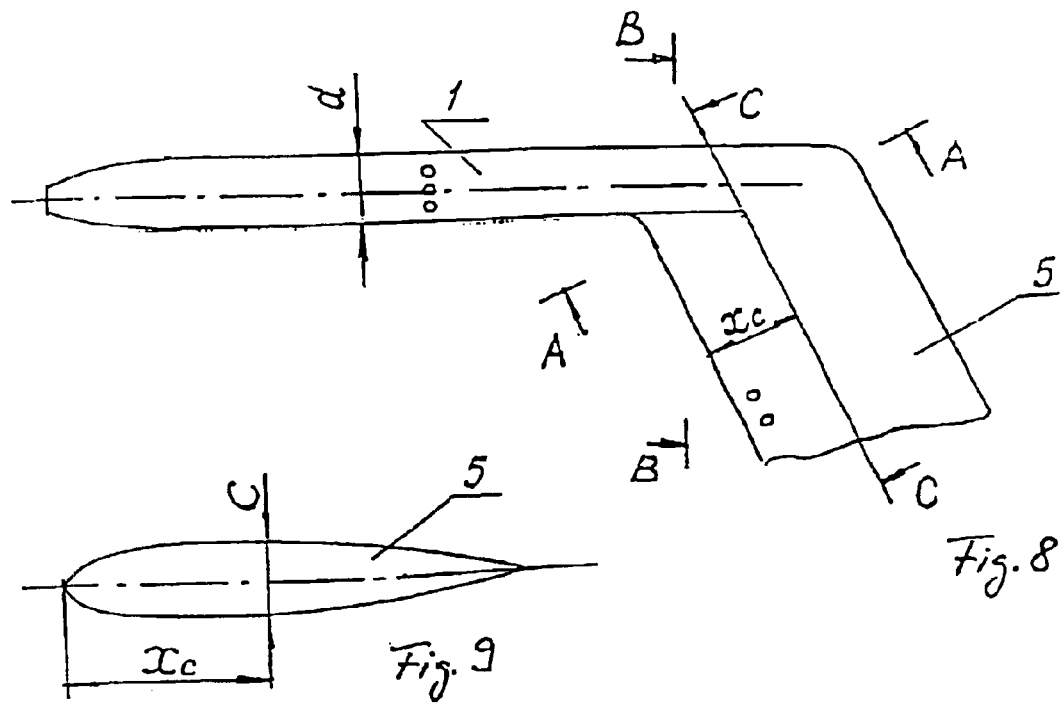
Fig. 8
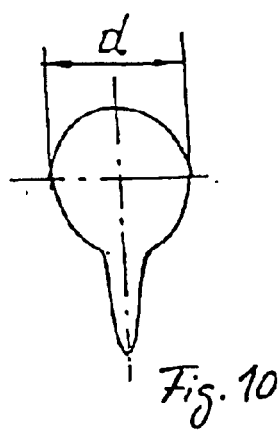
Fig. 9
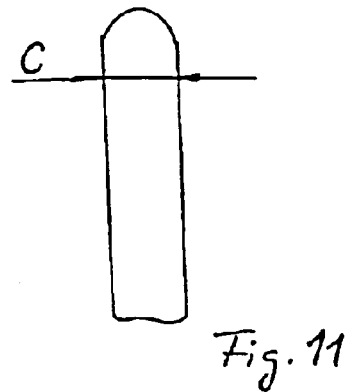
Fig. 10
Fig. 11

FUSELAGE PITOT-STATIC TUBE

CROSS-REFERENCE TO RELATED APPLICATIONS

This application is a continuation of U.S. patent application Ser. No. 09/355,409 filed Sep. 24, 1999 now U.S. Pat. No. 6,588,285 which is a 371 of PCT/EP 97/05156 filed Sep. 9, 1997.

STATEMENT REGARDING FEDERALLY SPONSORED RESEARCH OR DEVELOPMENT

Not applicable

REFERENCE TO A "SEQUENCE LISTING"

Not applicable

BACKGROUND OF THE INVENTION

1. Field of the Invention

The invention relates to the determination of the flight parameters of flying vehicles or to other fields of science and technology which deal with flows of liquid or gas.

2. Background Art

The measurement of flight parameters is one of the most important tasks of the aeromechanics and aerodynamics of flying vehicles (FVs). At the present time, in order to measure the flight (flow) parameters use is made of Pitot-static tubes (PSTs) which are, frequently, mounted directly on the fuselage of the aircraft or on the body of any other flying vehicle, and these PSTs actually measure parameters of the local flow, which is close to laminar. As a rule, several such PSTs are mounted on the flying vehicle and measure the local flow parameters. The true flight parameters are determined on the basis of preliminary calibrations.

BRIEF SUMMARY OF THE INVENTION

A Pitot-static tube mounted on the body or fuselage of an FV is known from WO 94/02858. The known PST has a cylindrical tube mounted on a strut having curved leading and trailing edges which approach one another as the tube is neared from the base of the strut. The leading orifice in the nose part of the tube for sensing the total pressure, and an orifice for sensing the static pressure at a certain distance from the nose of the tube. The tube has a heater for preventing the formation of ice. However, this Pitot-static tube cannot be applied for determining the angle of attack, since it lacks orifices for sensing pressure with the aid of which the angle of attack can be measured. In fact, as follows from the above-mentioned patent, this tube is not intended for these purposes. Moreover, the tapering of the strut, seen from the side, as the tube is approached leads, in conjunction with maintaining the internal volumes required for installing airways and heaters, to a marked increase in the relative thickness of the profiles of the transverse cross-sections of the strut. This leads, in turn, in the case of high sub-sonic speeds (Mach numbers of M=0.8–0.9) to the earlier appearance of local pressure shocks and a marked increase in the shock drag of such a Pitot-static tube.

A fuselage Pitot-static tube according to U.S. Pat. No. 4,615,213 is known for determining the flight (flow) parameters—angle of attack, total pressure Po and static pressure Ps and, consequently, also the Mach number M; it is an elongated axisymmetric body having a head part in the form of a hemisphere with groups of orifices on the axisymmetric body for measuring pressures by means of which the flight (flow) parameters are determined with the aid of calibrations. At the same time, the orifices for measuring the pressures by means of which the total pressure and angle of attack are determined are arranged on the hemispherical head part, while the orifices for measuring the static pressure are arranged on the lateral (cylindrical) surface of the axisymmetric body. For the purpose of mounting on the fuselage or body of the flying vehicle, this PST has a strut the profile of which has a lens-shaped tranverse cross-section. The given PST has the following disadvantages:

a complicated design;

increased overall dimensions of the axisymmetric body;

increased aerodynamic drag in subsonic flight regimes;

increased required power for the heater of the anti-icing system;

increased design weight;

increased sensitivity of the total pressure, measured with the aid of the central orifice on the spherical head part, to variation in angle of attack, which leads to additional errors in measurement of the total pressure; such a dependence of the total pressure on the angle of attack for a range of FVs is unacceptable.

The closest of the known technical solutions is disclosed in U.S. Pat. No. 4,378,696 for determining flight (flow) parameters—angle of attack, total pressure Po and static pressure Ps, and thus the Mach number M, which is an elongated axisymmetric body with a conical or ogival head part where an orifice is arranged for sensing total pressure, and which merges into a circular cylinder on whose surface orifices are arranged for sensing static pressure. Later, this cylindrical surface merges into a conical one, on which orifices are arranged for sensing pressure for which the angle of attack is set up correspondingly, and then merges again into the cylindrical surface. For the purpose of being mounted on the fuselage or the body of an FV, the tube has a strut whose cross-section has a lens-shaped profile. The given PST has the following disadvantages:

complicated design;

increased overall dimensions;

increased aerodynamic drag in subsonic flight regimes;

increased required power for the heater of the anti-icing system;

increased design weight;

low sensitivity of pressures, measured in orifices arranged on a conical part (and intended for determining $\alpha$, to the angle of attack, which leads to increased errors in determining the angle of attack. This is caused by the following factors:

1. As in the case described above, the given PST has an increased mid-section of the axisymmetric body. Moreover, the increased dimension of the mid-section is caused in the given instance by two circumstances. The first is that the cylindrical part of the axisymmetric body merges into a conical one on which orifices are arranged for sensing the pressure by which the angle of attack is determined. In order to increase a little the sensitivity of the pressure sensed by means of these orifices of the angle of attack, the angle of taper must be sufficiently large to lead to the necessity of increasing significantly the diameter of the axisymmetric body behind the given conical part.

The second circumstance is bound up with the fact that although groups of orifices for measuring pressure, which are used to determine total pressure, static pressure and angle of attack, are dispersed in the given configuration, they are all situated on the same axisymmetric body. There is a need to arrange inside the latter airways emerging from all the indicated groups of orifices, a static pressure chamber and also tubular electric heaters for the anti-icing system. The diameters of the airways and the TEHs cannot be less than a certain minimum values which for the airways are determined by the magnitude of the hydrodynamic lag and for the TEHs by the limiting values of the heat flux density and the temperature of the surface of the heaters. The result is a high design saturation, that is to say a complicated design of the axisymmetric body of the PST.

The circumstances indicated lead to an increase in the area of the mid-section, and consequently to an increase in the design weight, aerodynamic drag and power of the anti-icing system.

It should also be pointed out that transition from the cylindrical part to the conical one, and then again to the cylindrical one, can lead to separation of the flow behind the conical part and to an earlier appearance (in terms of the Mach number) of local pressure shocks. This, in turn, must lead to an increase in the aerodynamic drag. Moreover, the increased diameter of the axisymmetric body and the non-optimum form of its tail part in conjunction with the strut also lends [sic] an unfavorable aerodynamic interference (separation of the flow and earlier appearance of pressure shocks) in the area of the joint of the contracting tail part of the axisymmetric body of the PST behind the line of maximum thickness of the lens-shaped aerodynamic profile of the strut. This also leads to a certain increase in the aerodynamic drag of such a PST.

It may also be noted that the presence of a conical part on the axisymmetric body of a PST leads to the realization of additional support on the cylindrical part lying in front, where the orifices for measuring static pressure are arranged. As a result, the precise determination (without the introduction of corrections) of static pressure requires that the orifices for sensing it must be sufficiently far from this conical part. The leads to the need to increase the length of the axisymmetric body, and also leads to a certain additional increase in the design weight, and requires additional power in the electric heating anti-icing system.

2. The lens-shaped profile of the strut is not optimum from the point of view of the aerodynamic drag in subsonic flight regimes. This leads to a substantial increase in the aerodynamic drag of the strut of the PST in subsonic flight regimes. Moreover, at very low Mach numbers the increase in aerodynamic drag is caused by separation from the sharp leading edge of the strut with the lens-shaped profile, which always takes place, since the leading edge is sharp, at local angles of attack other than zero. Since the lens-shaped profile is not optimum from the point of view of shock drag, at high subsonic speeds (M=0.8–0.9) the aerodynamic drag of such a PST is also increased very greatly. Although sweeping the leading and trailing edges of the PST strut postpones the sharp increase in shock drag, it leads to an increase given the same stagger of the axisymmetric PST body with respect to the fuselage, that is to say given the same strut height, overall dimensions, weight and volume of design and, consequently, also the required power of the anti-icing system.

3. Electric heaters arranged inside the PST strut for preventing the formation of ice on its leading edge, and thereby preventing the influence of this ice on measurement of pressure on the axisymmetric body, are insufficiently efficient in use in the sense that they heat the strut on which no orifices are arranged for measuring pressure. This leads to a substantial increase in weight and required electric power.

4. The lens-shaped profile of the strut is not optimum from the point of view of:
 a predisposition to the formation of ice;
 the design of the anti-icing system.

This leads to a substantial increase in the required power of the anti-icing system of the actual strut of the PST, which is caused by the following circumstances.

As is known (compare, for example, Bragg M. B., Gregorek G. M., Lee J. D., Airfoil Aerodynamic in Icing Conditions. J. Aircraft, vol. 23, No. 1., 1986), the formation of ice on a flying vehicle during flight in the atmosphere takes place, first and foremost, in areas adjoining points where the flow is decelerated and in areas of separation of the flow from the leading edge (for example, the wing). At the same time, it is noted that sharp leading edges of the wing are frequently more strongly subjected to the formation of ice than rounded-off ones, since a stream with a separation of flow always forms on them in the case of angles of attack other than zero. Such an area of the strut of a PST is an area adjoining its leading edge. Since the lens-shaped profile of the strut has a sharp leading edge, a stream with separation of flow from the front edge can form even in the case of small angles of attack, and this can lead to an intense formation of ice.

Since the TEHs of the anti-icing system are quite bulky and occupy substantial volumes, they cannot be arranged inside the strut in the immediate vicinity of the sharp edge of the lens-shaped profile of the strut. As a result, the TEHs on such a strut are arranged near the line of maximum thickness of the profile of the strut, while the heating of the critical zone, where ice actually forms—the area near the leading edge of the strut of the PST, results from heat transfer directly over the structure of the strut, from the line of maximum thickness to the leading edge. Although struts of modem PSTs are made from materials which conduct heat very well and are very expensive (for example, from nickel alloys), very large, inefficient heat losses reaching an estimated 50% are inherent in such a design.

Thus, the low coefficient of use for the energy supplied to the electric heaters is characteristic of such a design of a PST. However, since they are quite bulky this leads to a significant increase in the design weight.

5. The difference in the pressures measured at the conical part of the PST has a comparatively weak sensitivity to the change in the angle of attack, and this leads to increased errors in the measurement of the angle of attack. The increase in the aperture of the cone somewhat exceeds the sensitivity, but this leads to an increase in the diameter of the mid-section of the axisymmetric body of a PST, which entails an increase in the design weight, the aerodynamic drag and the required power of the anti-icing system. There are bodies where this sensitivity is substantially higher.

The nearest of the known symmetrical aerodynamic profiles suitable for use on the strut of a PST are the profiles of the NACA-OOXX series (where XX is the relative thickness of the profile in percent); the disadvantage of these profiles resides in the rapid growth in shock drag at high transonic numbers M. This is caused by the high degree of the differing effect of the profiles in the zone located behind the maximum thickness of the profile, which causes the earlier appearance of the pressure shock, as well as an increase in its intensity.

The objects of the invention are:
 simplification of the design,
 reduction in the overall dimensions,
 reduction in the aerodynamic drag of the axisymmetric body of the PST, reduction in the aerodynamic drag of the strut of the PST by developing the contour of the symmetrical aerodynamic profile for the strut of the PST which has a higher critical Mach number in the operating range of numbers M=0–0.85 by comparison with known symmetrical aerodynamic profiles, in particular with a lens-shaped profile (composed of arcs of a circle) or profiles of a series NACA-OOXX for identical values of the relative thickness, reduction in the required power of the heating anti-icing system, reduction in design weight, an increase in the accuracy of determination of the angle of attack on PSTs intended for subsonic non-manoeuvered flying vehicles.

The technical result is achieved by virtue of the fact that the fuselage Pitot-static tube comprising three groups of orifices for determining the total pressure, static pressure and angle of attack, and an axisymmetric body and strut for mounting an anti-icing system having, arranged between them, airways and electric heating elements, is constructed in such a way that the orifices for determining the angle of attack are arranged on the strut, whose cross-section is constructed in the form of a subsonic aerodynamic profile with a rounded-off nose or a tapered nose, and lie at some distance from the nose of the profile up to its maximum thickness.

For the purpose of a greater reduction in the aerodynamic drag of the fuselage sensor, the tail part of the axisymmetric body may terminate with and may be smoothly joined to the aerodynamic profile of the strut in the region of its maximum relative thickness, while for the purpose of reducing the aerodynamic drag at high subsonic speeds the tail part of the axisymmetric body can have a taper and base cut, and for this purpose the trailing edge of the aerodynamic profile of the strut can also have a base cut.

In order to compensate for the influence of the fuselage or support of the strut on the measured static pressure, the axisymmetric body may have on the cylindrical part a swelling on which the orifices for measuring the static pressure are arranged.

The aerodynamic profile of the strut can be constructed asymmetrically for the purpose of additionally increasing the sensitivity of the variation in pressure to the angle of attack and of extending the range of the angle of attack.

For the purpose of an even greater reduction in the required power of the anti-icing system, the electric heating elements of the anti-icing system may be displaced towards the leading edge of the strut.

A simplification of the design of the axisymmetric body and a substantial reduction in its diameter are achieved by virtue of the fact that the orifices for measuring pressure, which are used to measure the angle of attack, are arranged not on the axisymmetric body but on the strut of a PST. Since the design weight is proportional to the cube of its linear dimensions, given the same length of the axisymmetric body, reduction in its weight will be determined as the product of a certain coefficient and the difference of the squares of the diameter of the axisymmetric body of the PST prototype and the proposed PST. Since the aerodynamic drag of the axisymmetric body given a zero angle of attack of the PST is proportional to the area of its mid-section, the reduction in the aerodynamic drag of the PST were it to have the same form as the PST prototype would also be proportional to the difference of the squares of the diameters of the axisymmetric body of the PST prototype and the proposed PST. However, since the form of the axisymmetric body of the proposed PST does not have additional steps (conical step with a subsequent swelling) as in the PST prototype, there will be no separation of flow on it nor any appearance of pressure shocks behind the conical step. Thus, the reduction in the aerodynamic drag will be even larger. Since the required power for heating the axisymmetric body is proportional to the area of the surface of revolution of the axisymmetric body, reduction in the power for heating the proposed PST by comparison with the PST prototype (given the same temperature of their surface) is proportional to the difference between the diameters of the axisymmetric body of the PST prototype and the proposed PST. Moreover, reduction in the required power of the heating system leads to a reduced weight of the TEHs.

The strut of the PST can be constructed in such a way that its cross-sections have the form of a subsonic aerodynamic profile with a chord of length B, a rounded-off leading edge and a sharpened or blunted trailing edge interconnected by the smooth lines of the contour of the upper and lower surfaces. The lower part of the contour of the profile is symmetrical to the upper part relative to the profile chord. The leading edge of the profile has a radius of curvature Rc which is in the range of Rc=0.030*B–0.034*B, in that the maximum relative thickness of the profile C is in the range of C=0.146–0.156 and is arranged at a distance of X=0.3*B–0.6*B, measured from the leading edge along its chord. The radius of curvature of the upper part of the profile contour increases smoothly along the profile chord with increasing distance X from the rounded-off leading edge up to the values of X=(0.3–0.6)*B for which part of the contour has a virtually rectilinear form up to the values of R=5.5*B–15.*B, it being the case that distance Yu, measured from the profile chord along the normal to it upwards to the upper part of the profile contour, increases smoothly to its maximum value of Yumax=0.074*B=0.078*B. The distance Yu further decreases smoothly along the direction towards the trailing edge, the radius of curvature firstly decreases smoothly down to the values of R=0.6*B–1.*B for X=0.82*B–0.95*B, and thereafter it increases smoothly up to the values of X=0.92*B–0.95*B, where the convex part of the contour is joined smoothly to its concave tail part and, further, the radius of curvature of the concave part of the contour decreases smoothly, reaching at the trailing edge of the profile values of R=0.05*B–0.5*B, the angle between the tangent to the profile contour and the chord of the profile at its trailing edge being 3–6 degrees for X=B. As the results of the calculations showed, the selected form of the contour and the distribution of curvature along its chord permits a substantial reduction in the shock drag of the profile both in comparison with the profile of the PST prototype (lens-shaped) and in comparison with the profile prototype (NACA 0015). Since when producing flying vehicles it is possible in a real design to realize theoretical coordinates of the profile contour only with a certain limited accuracy determined by the aggregate deviations of the actual coordinates of the points of the profile contour from the theoretical ones, which deviations accumulate at all stages of design and manufacture, the coordinates of the profile contour corresponding to the given invention must be in the interval of values given by Table 1:

TABLE 1

| X/B | Yu/B | −Yl/B |
|---|---|---|
| 0.0000 | 0.000 | 0.000 |
| 0.0333 | 0.0346–0.0376 | 0.0346–0.0376 |
| 0.0640 | 0.0477–0.0507 | 0.0477–0.0507 |

TABLE 1-continued

| X/B | Yu/B | -YI/B |
|---|---|---|
| 0.1044 | 0.570–0.0600 | 0.0570–0.0600 |
| 0.2171 | 0.0690–0.0730 | 0.0690–0.0730 |
| 0.3242 | 0.0725–0.0765 | 0.0725–0.0765 |
| 0.4013 | 0.0739–0.0779 | 0.0739–0.0779 |
| 0.5204 | 0.0736–0.0776 | 0.0736–0.0776 |
| 0.5992 | 0.0721–0.0761 | 0.0721–0.0761 |
| 0.7105 | 0.0681–0.0721 | 0.0681–0.0721 |
| 0.8067 | 0.0602–0.0642 | 0.0602–0.0642 |
| 0.8603 | 0.0510–0.0550 | 0.0510–0.0550 |
| 0.9464 | 0.0248–0.0288 | 0.0248–0.0288 |
| 1.0000 | 0.0000–0.0160 | 0.0000–0.01600 |

In practice, additional design and aerodynamic requirements frequently arise, which amount to comparatively small changes in the relative thickness of the profile and are expressed in the fact that the dimensionless ordinates, referred to its chord, of the contours of the upper Yu/B and lower YI/B surfaces differ from corresponding dimensionless ordinates of the base profile of the original relative thickness by equal constant numerical factors.

The transition to a different relative thickness for the profile by the given invention is possible by multiplying the ordinate of its contour by equal constant numerical factors Ku for the upper and KI for the lower parts of the contour, the radii of curvature of the leading edge of the profile over its upper and lower surfaces varying in a fashion proportional to the square of the coefficients, and the numerical values of these factors having to be in the ranges of 0.8<Ku<1.07 and 0.8<KI<1.07. Owing to the fact that the strut of the PST is constructed in such a way that its cross-sections have the form of a subsonic aerodynamic profile with a rounded-off nose, and not of a lens-shaped profile, as on the PST prototype, its aerodynamic drag can, as indicated by calculations, be reduced by 2–2.5 times in the case of the number M=0.8–0.9.

It is known that the formation of ice during flight in the atmosphere chiefly affects areas of flow deceleration or areas where a separation of flow is formed. Owing to the occurrence on them of streams with flow separation, sharp leading edges are frequently more subject to the formation of ice than are rounded-off ones. Since, by contrast with the lens-shaped profile, where even at small angles of attack a stream is formed with separation of flow from the leading edge, there is no separation of flow at small angles on a subsonic aerodynamic profile with a rounded-off nose, the strut of the proposed PST is less subject to the formation of ice than the strut of the PST prototype. Moreover, in the case of the strut of the PST prototype, because of the fact that it has a cross-section in the form of a lens-shaped profile, it is difficult or virtually impossible to arrange the electric heaters of the anti-icing system immediately next to the nose of the profile, since the volumes required for this are not present inside. Consequently, the electric heaters for such a PST are arranged not in the nose itself (which is most subject to the formation of ice) but near the centre of the profile. As a result, heating of the nose is due to heat transfer along the strut, and this causes large power losses (estimated at up to 50%). In the proposed PST, the radius of the nose of the subsonic aerodynamic profile can be made sufficiently large to permit the electric heaters to be arranged directly in the nose of the strut, and thereby to reduce power losses by 25–30%.

Since the critical Mach number (at which pressure shocks occur) on the subsonic aerodynamic profile with a rounded-off nose, in particular on the profile according to the given invention, can be substantially lower than on a lens-shaped one, the sweep angle of the strut of the PST designed for flights with M=0.8–0.9 can be made substantially smaller for the proposed PST than for the strut of the PST prototype. As estimates indicate, for the same height of the struts and profile chord this yields a reduction in the length of the PST and a gain in design weight by 10–15%.

Since the sensitivity to variation in the angle of attack of pressures measured on a subsonic aerodynamic profile with a rounded-off nose is substantially higher than on a cone, the error in measurement of the angle of attack is substantially lower for the proposed PST than for the PST prototype.

The trailing edge of the aerodynamic profile of the section of the strut can be constructed with a base cut for the purpose of additionally reducing the shock drag at numbers of M=0.8–0.9 involving, in terms of Mach number, occurrences of pressure shocks and their displacement to the tail of the profile owing to the lesser diffusor effect of the profile behind the point of its maximum thickness. Constructing the tail part of the axisymmetric body with a taper and base cut also permits, in a fashion analogous to the aerodynamic profile, a reduction in the shock drag of the PST. If the tail part of the axisymmetric body starts to taper in the area of the maximum thickness of the profile of the strut, a strong diffuser which leads to an earlier occurrence of local pressure shocks and an increase in aerodynamic drag is formed in the area of the joint of the tail part of the body and the strut. In the case when the axisymmetric body is constructed in such a way that its tail part terminates with and is smoothly joined to the aerodynamic profile of a strut in the area of its maximum relative thickness, there is an improvement in the interference of the axisymmetric body and strut, and there is an additional substantial decrease in the aerodynamic drag of the PST because of the absence of an additional diffuser. Owing to the fact that the aerodynamic profile of the strut can be constructed asymmetrically, there is an increase in the sensitivity of pressure to the angle of attack, and it is thereby possible additionally to increase the accuracy of measurement of the angle of attack; moreover, the range of the angle of attack can be widened owing to the asymmetry of the profile. To compensate the effect of deceleration from the strut on the measurement of static pressure, the axisymmetric body can have on the cylindrical part a swelling on which orifices for measuring static pressure are arranged. Owing to the acceleration of the flow on this swelling, it is possible to find an area where the deceleration from the strut is compensated for by this acceleration and, consequently, the precise static pressure can be selected from the indicated orifices. Because of the displacement of the electric heating elements towards the leading edge of the strut, there is a substantial reduction in the inefficient thermal losses by comparison with the PST prototype, and a reduction in the required power for heating.

The construction of the invention, however, together with additional objects and advantages thereof will be best understood from the following description of specific embodiments when read in connection with accompanying drawings.

BRIEF DESCRIPTION OF THE SEVERAL VIEWS OF THE DRAWING(S)

FIG. 8 shows a side-elevational view of an alternative embodiment of the invention with an axisymmetric body whose tail part terminates with and is smoothly joint to the aerodynamic profile of the strut in the area of its maximum relative thickness;

FIG. 9 is a cross-sectional view taken along the line A—A in FIG. 8;

FIG. 10 is a cross-sectional view taken along the line B—B in FIG. 8;

FIG. 11 is a cross-sectional view taken along the line C—C of FIG. 8;

Figure 24:
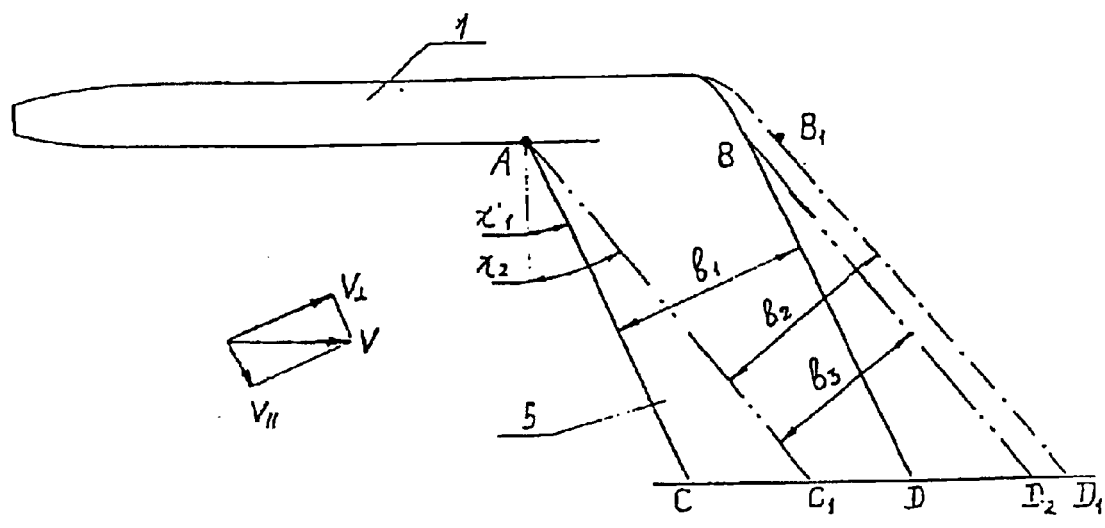
Figure 25:
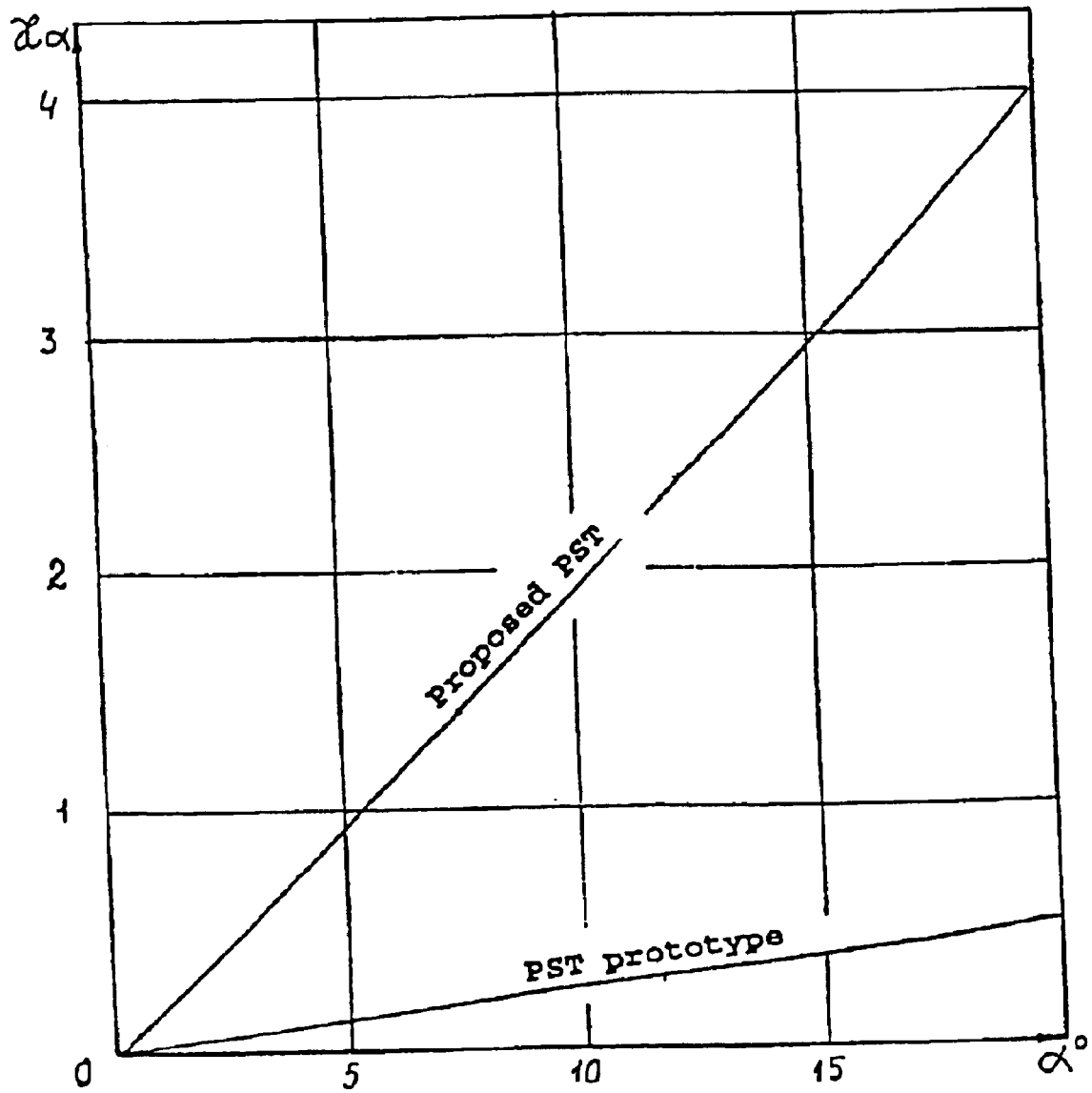

FIG. 24 is a side elevational view of a PST showing how the sweep of the strut at the leading edge affects the magnitude of the chord of the cross-section of the strut when the internal volumes of the section are maintained. The following designations are introduced here: ABCD is the lateral projection of the strut with a sweep of $\chi 1$ and a chord of section b1, S1 is its area; AB1C1D1 is the lateral projection of the strut with a sweep of $\chi 2 > \chi 1$ and a chord b2=b1, its area is SAB1C1D1>SABCD; ABC1D2 is the lateral projection of the strut with a sweep of $\chi 2$, the area of which is SABC1D2 =SABCD, but its chord is b3<b1; V is the rate of flow, and V⊥, V∥ are the velocity components normal to the leading edge and, correspondingly, parallel to it;

FIG. 25 is a diagram showing the dependence of the angular calibration coefficient $æ_\alpha$=(P6–P7)/(P2–P3) for determining the angle of attack for the proposed PST, and also for the PST prototype, in which the orifices for determining the angle of attack are arranged on the conical part of the axisymmetric body, where Pi are the pressures measured at the corresponding i orifices; 2, 3 denote orifices arranged correspondingly in the nose part and on the cylindrical surface of the axisymmetric body, both on the proposed PST and on the PST prototype; the numerals 6, 7 denote orifices on the strut in the proposed PST or on the conical part of the axisymmetric body in the case of the PST prototype.

Figure 26:
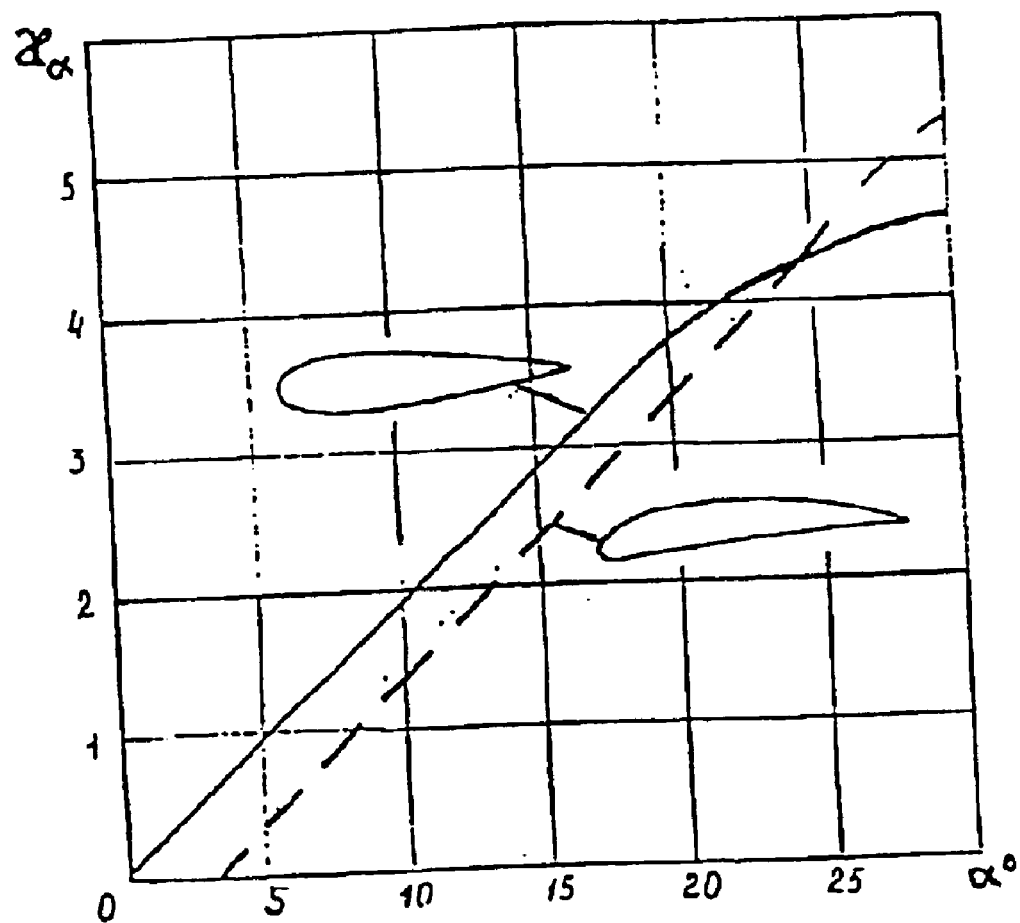
Figure 27:
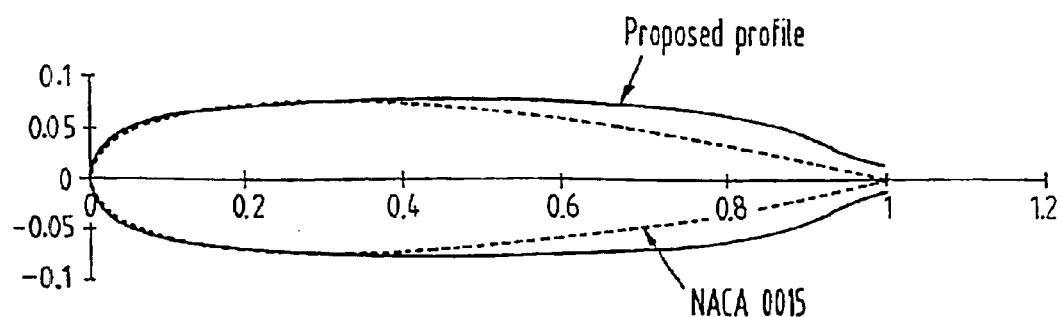
Figure 28:
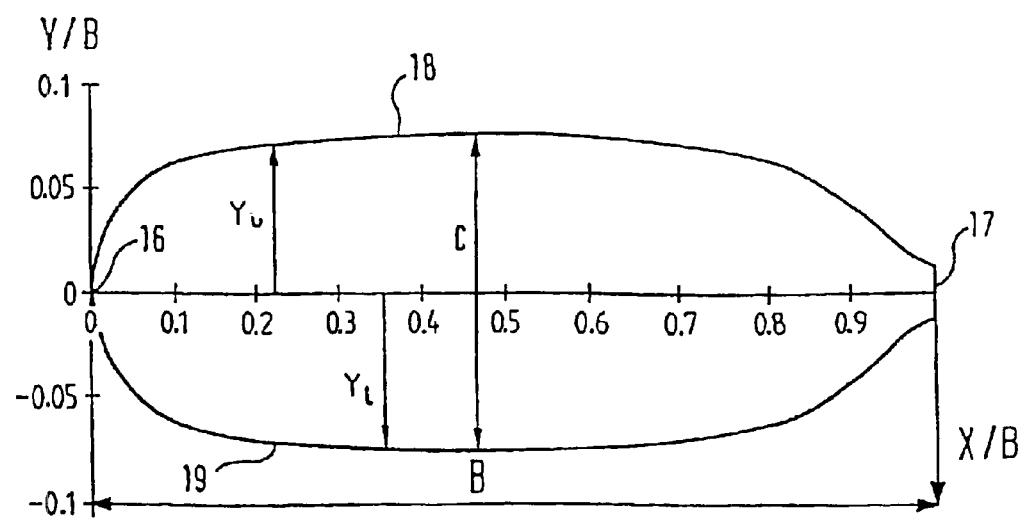
Figure 29:
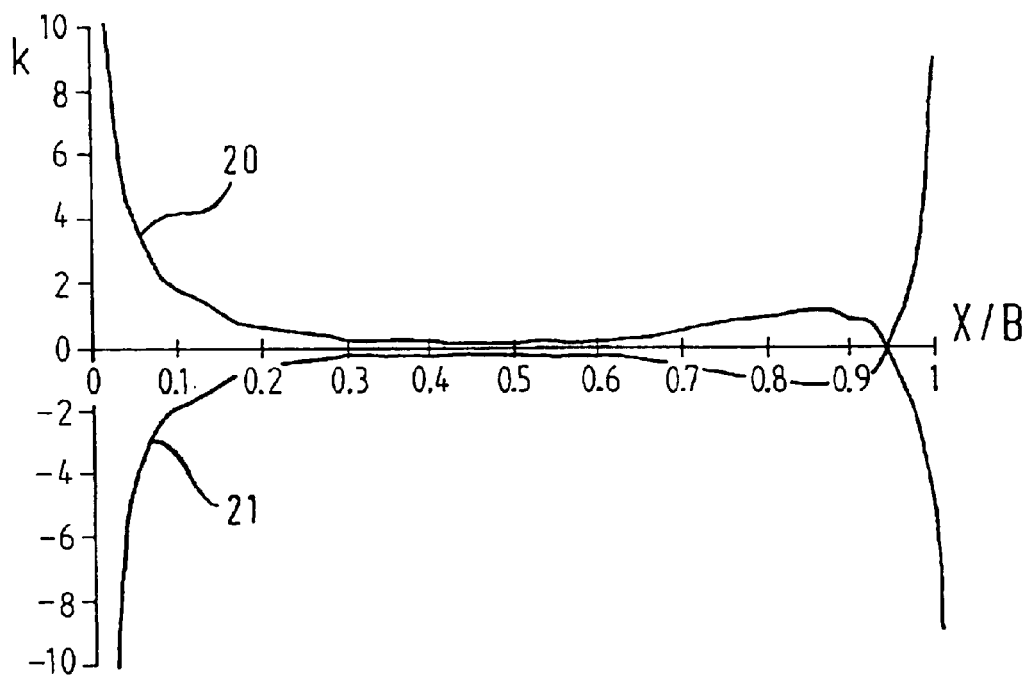
Figure 30:
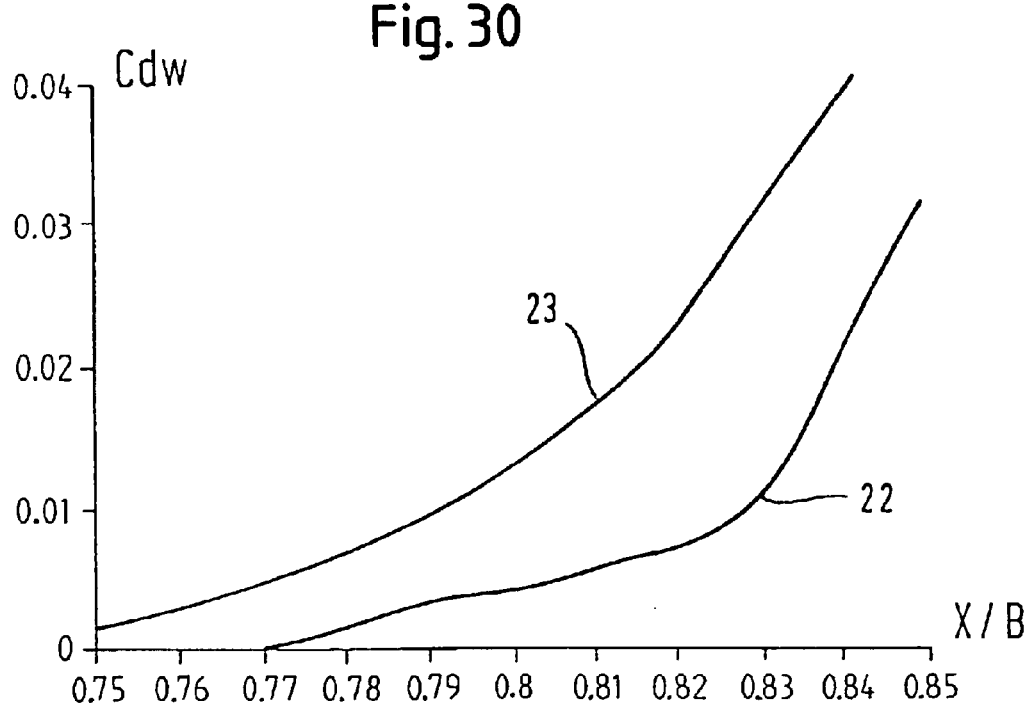

FIG. 26 is a diagram showing a comparison of the dependencies for the symmetric and asymmetric aerodynamic profiles of the strut;

FIGS. 27 & 28 are diagrams showing the basic elements of the profile for the given invention, and a comparison of the contrary of the given profile an the NACA-0015 profile;

FIG. 29 shows the distribution along the profile chord of the curvature K(A quantity inversed to the radius of curvature) for the chord the profile designed in accordance with the given invention;

FIG. 30 is a diagram showing the comparison of the calculated magnitudes of the shock-drag coefficient Cdw of the given profile and the profile prototype;

FIGS. 31a–31g show the schematical cross-sectional views of variants of the strut.

DETAILED DESCRIPTION OF THE INVENTION

The fuselage Pitot-static tube (FIG. 1) comprises an axisymmetric body 1 in whose nose part an orifice 2 is arranged for determining total pressure; orifices 3 for sensing static pressure are arranged on the lateral surface. TEHs 4 of an anti-icing system are located inside the axisymmetric body 1. The axisymmetric body is mounted on the strut 5, which has the form of a subsonic aerodynamic profile with a rounded-off nose on which there are arranged at a distance from the nose up to its maximum thickness orifices 6, 7 for determining the angle of attack, while TEHs 8 are arranged inside the strut. To reserve the orifices, several orifices 6, 7 can be arranged in each case on the upper and lower surfaces of the profile. The PST is mounted on the fuselage with the aid of a flange 9. Pressures from the orifices 2, 3, 6, 7 are lead out of the PST with the aid of airways 10 and nozzles 11, while heating the axisymmetric body and strut of the PST is performed with the aid of electric heaters 4, 8 via an electric connector 12.

The fuselage Pitot-static tube operates in the following way. Pressures sensed by the orifices 2, 3, 6, 7 are transmitted via nozzles 11 into a block of transducers which transforms the pressures into electric signals. These electric signals are sent into an information-processing block in which the flow (flight) parameters Po, Ps, α are determined in accordance with calibration dependencies. Electric energy is supplied to the TEHs 4 and 8 via the electric connector 12 in order to prevent the formation of ice, which can strongly distort the measurements or lead to obstruction of the orifices and failure of the PST. The electric TEHs 4 and 8 heat the external envelope of the axisymmetric body 1 and of the strut 5, and also the airways 10, which are manufactured, as a rule, from highly thermally conductive materials (for example, nickel). The power of the TEHs and of the electric energy supplied is selected so as to prevent the formation of ice on surfaces of the axisymmetric body 1 and strut 5 and in the orifices 2, 3, 6, 7.

Figure 5:
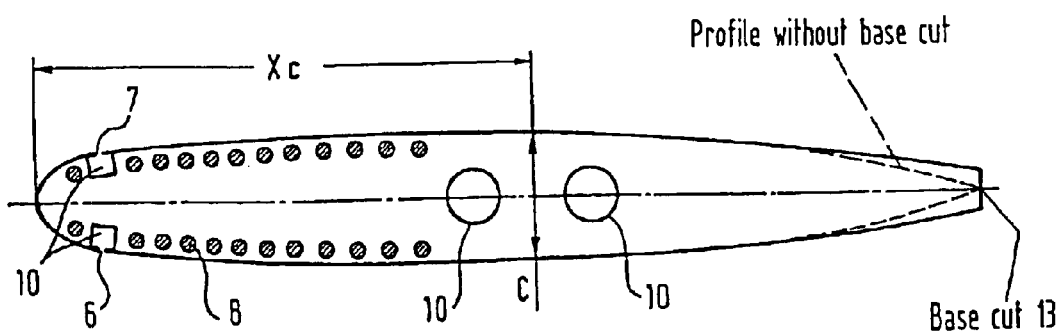
FIG. 5 is a cross-sectional view taken along the line A—A of FIG. 4.

The aerodynamic profile of the strut 5 has a base cut 13 in order further to reduce the aerodynamic drag at numbers of M=0.8–0.9 (FIG. 5).

Figure 6:
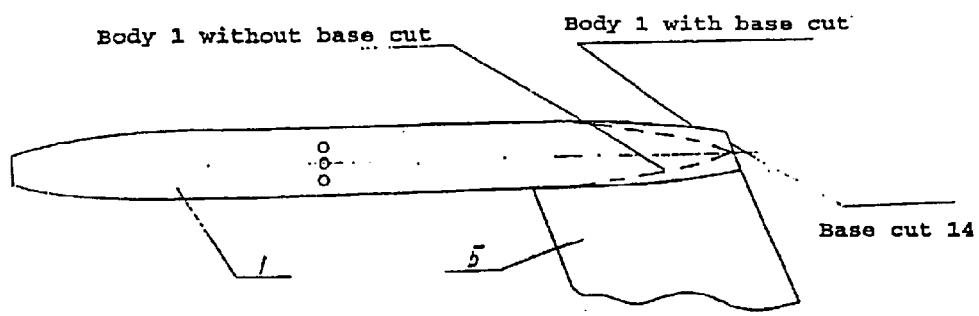
FIGS. 6 & 7 show variants of the proposed PST with an axisymmetric body having a taper and base cut in the tail part.
Figure 7:
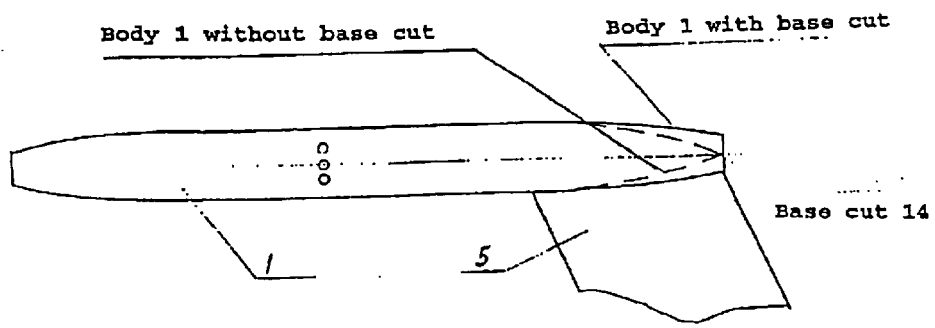

The tail part of the axisymmetric body 1, is constructed with a taper and a base cut 14 in order further to reduce the aerodynamic drag (FIGS. 6, 7).

The tail part of the axisymmetric body is joined smoothly with and terminates in the area of the maximum relative thickness of the aerodynamic profile C (FIGS. 8–11) for the purpose of additionally reducing the aerodynamic drag by improving the interference between the axisymmetric body 1 and strut 5.

Figure 12:
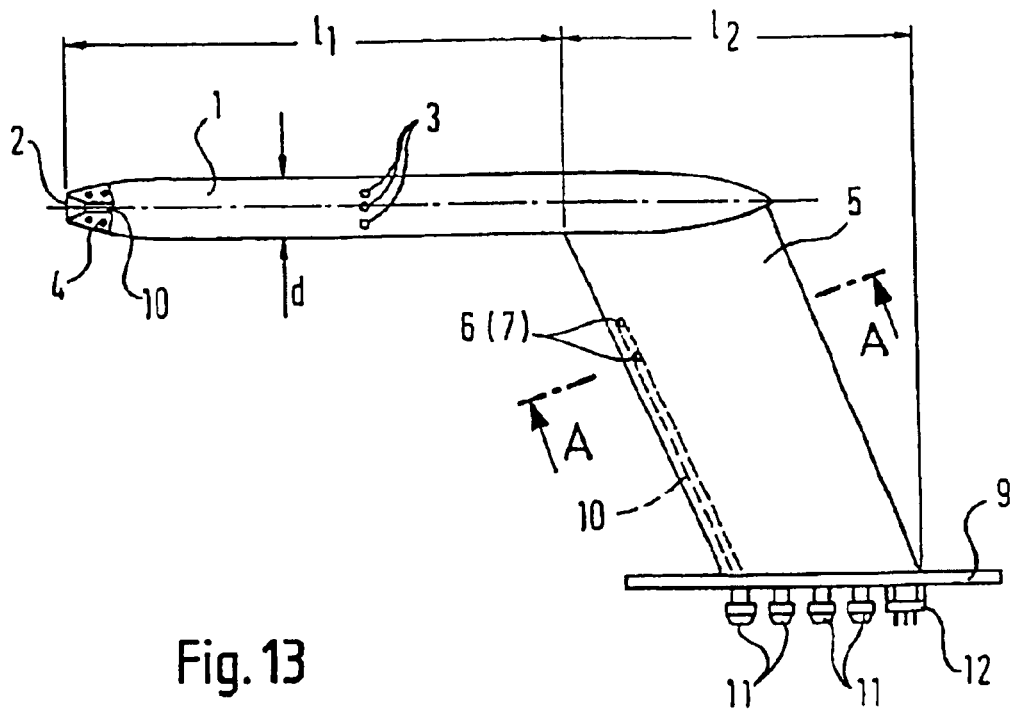
FIG. 12 shows a side-elevational view of a variant of the proposed PST with an asymmetric aerodynamic profile of the strut.
Figure 13:
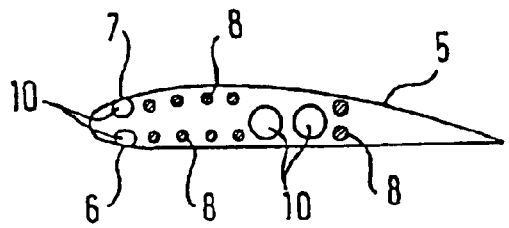
FIG. 13 is a cross-sectional view taken along the line A—A of FIG. 12.
Figure 14:
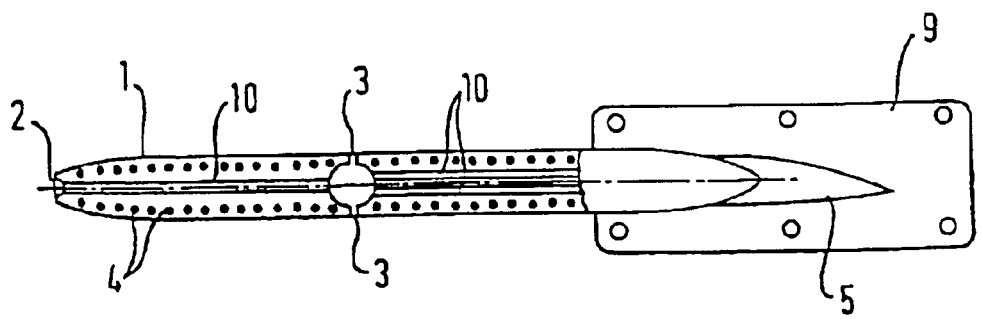
FIG. 14 is a top plan view of the PST according to FIG. 12.

An asymmetric aerodynamic profile of the strut may be applied for the purpose of additionally increasing the sensitivity to variation in the angle of attack and thereby increasing the accuracy of its determination, and also for the purpose of extending the range of measurement of the angle of attack (FIGS. 12–14).

Figure 15:
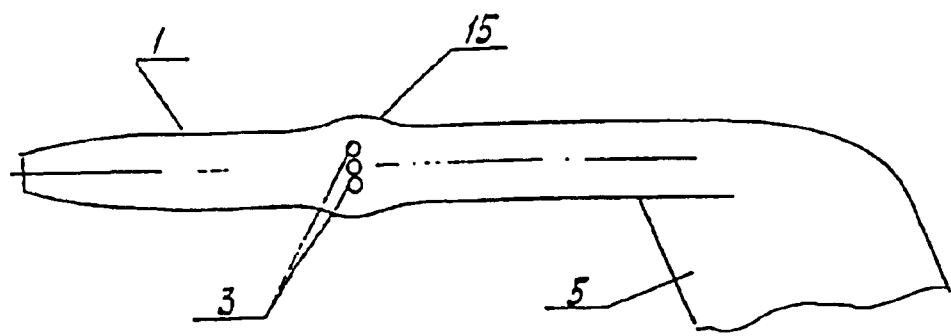
FIG. 15 shows a side-elevational view of further variant of a PST according to the invention on which an axisymmetric body on the cylindrical part has a swelling on which there are arranged orifices for measuring static pressure.
Figure 16:
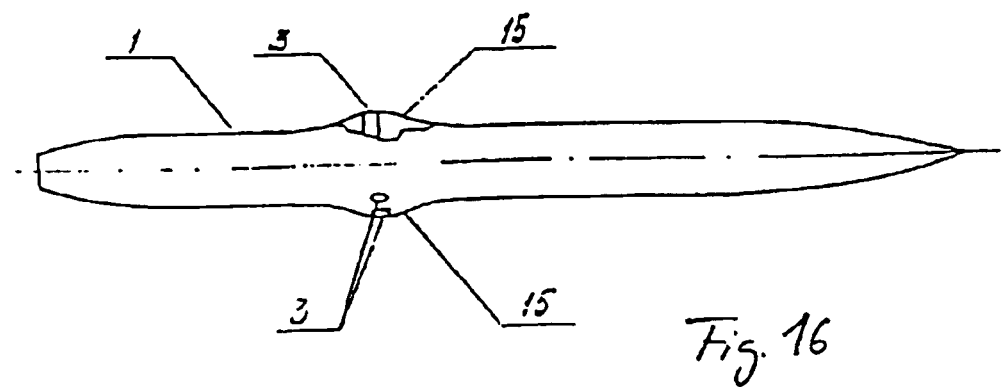
FIG. 16 shows a top plan view of the PST according to FIG. 15.

In order to compensate for the effect of deceleration from the strut on the measured static pressure, the axisymmetric body 1 can have on the cylindrical part a swelling 15 (FIGS. 15, 17) on which there are arranged orifices 3 for measuring the static pressure.

Figure 17:
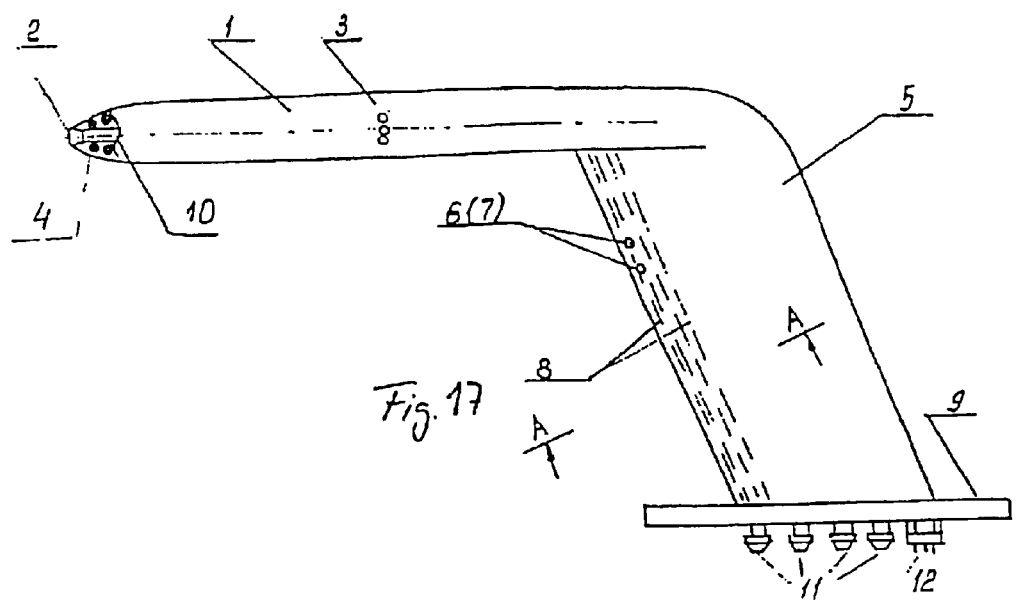
FIG. 17 shows a side-elevational view of a variant of the PST according to invention with electric heating elements of an anti-icing system which are displaced towards the leading edge of the strut.
Figure 18:
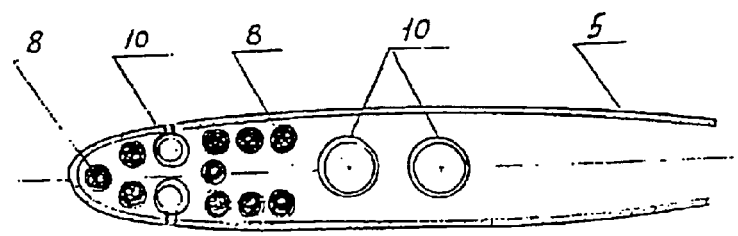
FIG. 18 shows a cross-sectional view taken along the line A—A of FIG. 17.
Figure 19:
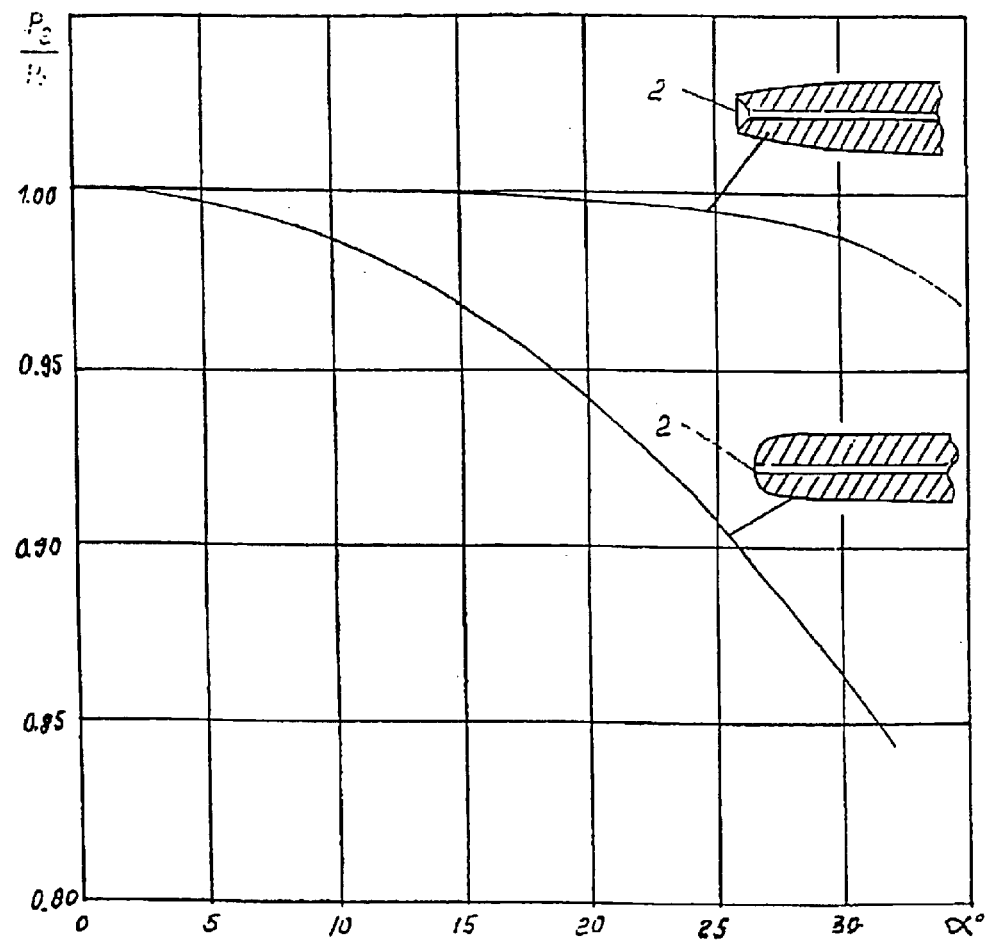
FIG. 19 shows a diagram with the variation in the ratio of the total pressure P2, sensed by the orifice 2, to the true total pressure Po for the proposed PST and a PST with a spherical head part, as a function of the angle of attack for a Mach number M=0.8.

For the purpose of further reducing the required power of the anti-icing system, the electric heaters 8 can be displaced towards the leading edge of the strut 5 (FIGS. 17, 18).

It is expedient to make use on the strut of the PST of profiles which are normal to its axis of sections of maximum thickness, which is arranged at a distance of X=0.3*B–0.6*B from the leading edge, which profiles have leading and middle parts which are as swollen as possible and a maximum critical Mach number for a given range of permissible relative thicknesses of the profile and an adequate range of working angles of attack within the limits of up to α=18–20%. An aerodynamic profile in accordance with the given invention meets these requirements.

FIGS. 27 & 28 show the aerodynamic profile in accordance with the given invention, having a rounded-off leading edge 16 and a sharpened or blunted trailing edge 17 which are interconnected by the smooth lines of the contours of the upper 18 and lower 19 surfaces; its leading edge 16 is constructed with a radius of curvature of the upper and lower surfaces of the profile, referred to its chord Rc/B, which is in the range of 0.03–0.034. The maximum relative thickness of the profile is approximately equal to 0.15 and arranged at a distance of 0.3*B–0.6*B from its leading edge, while the ordinates of the contours, referred to the profile chord and laid off along the normal thereto, of the upper Yu/B and lower Yl/B surfaces at a distance, referred to the profile chord, from its leading edge of X/B are arranged in the ranges set forth in Table 1. The ranges, presented in Table 1, of the ordinates of the upper and lower surfaces of the profile correspond approximately to permissible design/technical deviations of its actual coordinates from their theoretical values. The smoothness of the profile according to the given invention ensures a continuous and smooth variation in the curvature of its contour. The distribution of the curvature of the contour (magnitude, inverse radius of curvature) along the profile chord is present in FIG. 14 for the upper part of the contour (curve 20) and for the lower part of the contour (curve 21).

The design merit of the given profile as applied to the strut of the PST according to the given invention is to ensure adequate fullness of its nose and middle parts, which substantially facilitates the arrangement of the airways and heating elements of the PST in the profile contour.

FIGS. 29 and 30 also show calculated estimates of the magnitudes of shock drag for the proposed profile 22 and profile of the prototype 23, which illustrate the marked advantage of the proposed profile.

The basic aerodynamic advantage of the given profile by comparison with known profile analogues of close relative thickness in the case of its use on the strut of a PST according to the given invention is the increased value of the critical Mach number, which renders it possible to operate on its subcritical values in the operating range of flight speeds which is characteristic of subsonic civil aircraft, in conjunction with a moderate angle of sweep of the strut of the PST. The high aerodynamic efficiency of the profile according to the given invention is caused by the smoothness of its contour and the rational combination of the basic geometrical parameters (indicated magnitudes of the distances of the points of the profile contour from its chord, its radii of curvature and the angles of slope of the tangents to the contour). The form of the profile contour according to the given invention is determined so as to achieve in the leading part of the profile a level of the magnitudes of the rarefaction of the flow which is lower given identical values of the angle of attack (by comparison with the prototype NACA OOXX) in the case of maximum profile lift in the range of numbers M=0.2–0.5 and, correspondingly, a larger range of non-separated profile flow; in this case, a pressure distribution close to a "shelved" distribution is realized in the transonic range and has a less intense (by comparison with the prototype) pressure shock, and thereby a value of the shock drag which is 1.5–3 times lower.

The following may be achieved by using the invention on subsonic non-manoeuvrable aircraft:

design simplifications, reductions in overall dimensions, reductions in aerodynamic drag, reductions in the required power of the anti-icing system of a PST, weight reductions, increase in the accuracy of measurement of the angle of attack.

Let us demonstrate this.

Figure 1:
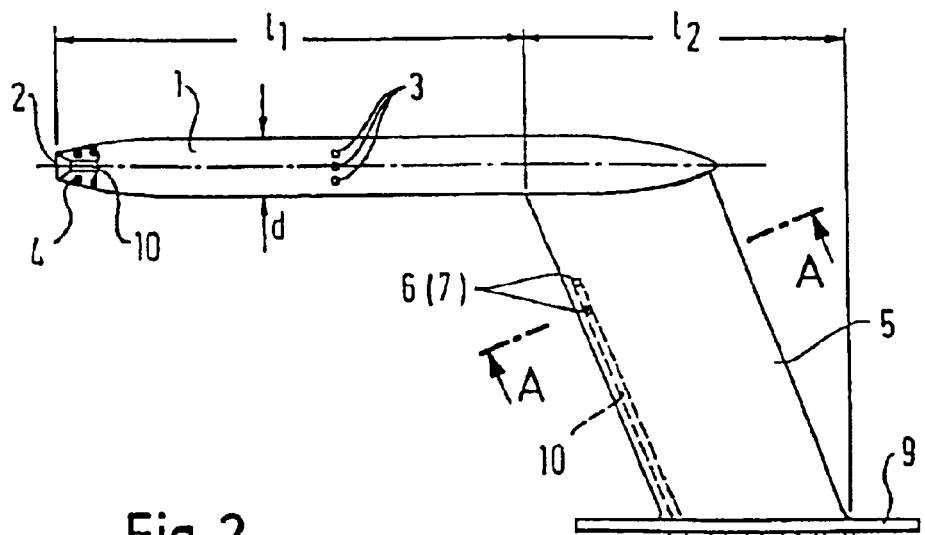
FIG. 1 shows a side-elevational view of one of the variants of the proposed PST.
Figure 2:
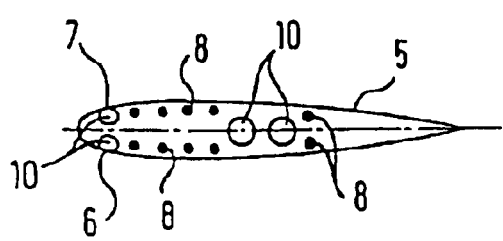
FIG. 2 is a cross-sectional view taken along the line A—A of FIG. 1.
Figure 3:
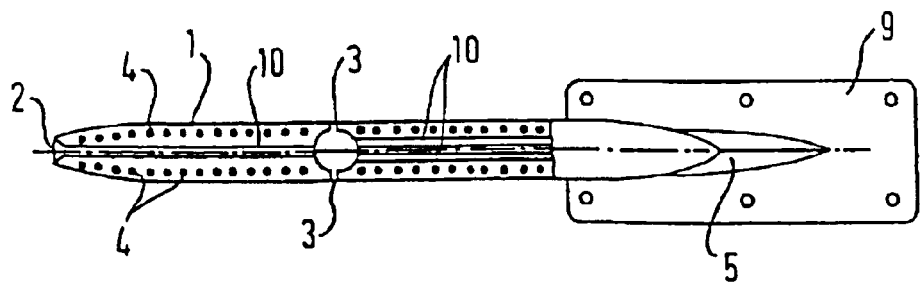
FIG. 3 is a top-plan view on the PST according to FIG. 1.

1. Design simplification is achieved owing to the fact that the orifices for tapping pressure and on the basis of which the angle of attack is determined are arranged not on the axisymmetric body of a PST, where the orifices for tapping total and static pressures are still arranged, but on the strut of a PST (FIGS. 1–3). The design saturation of a PST is very high, because there are airways departing from each of the indicated groups of orifices, and it is also necessary to arrange electric heating elements of the anti-icing system inside the axiymmetric body and strut. As a result of the transfer of the orifices for measuring angle of attack from the axisymmetric body to the strut, the design saturation is decreased, and the construction of the axisymmetric body and the entire proposed PST with the strut is substantially simplified.

2. As a result of the transfer of the orifices for tapping pressure, by means of which the angle of attack is determined, from the axisymmetric body onto the strut, the diameter d of the axisymmetric body is substantially decreased (FIGS. 1–3). The design studies carried out indicate that the diameter of the axisymmetric body of the proposed PST can be reduced by approximately 25% by comparison with the PST prototype (in conjunction with the same diameters of the internal airways and electric heating elements; only because of the absence of the conical part on the axisymmetric body).

Moreover, as a result of the absence on the axisymmetric body of the proposed PST of a conical part, an additional support is lacking on it which is realized on the PST prototype in the area of arrangement of the orifices for measuring static pressure. As a result, given the same accuracy of measurement of the static pressure (without the introduction of corrections), the length (FIGS. 1–3) of the axisymmetric body up to the strut can be realized on the proposed PST to be shorter than on the PST prototype. Estimates show that this reduction in length is about 20%.

One more factor promoting the reduction of the overall dimensions (length of a PST) is the application on the strut of a subsonic aerodynamic profile with a rounded-off nose, as a result of which the sweep of the leading edge of the strut (FIG. 24) can be substantially reduced (see item 3 for more detail). As a result, given the same height of the strut and tuning of the PST to the same Mach numbers, the length of the strut can be reduced by 5–7%, it being possible for the overall length of the PST (axisymmetric body with strut) to be reduced by 25–27%.

3. The aerodynamic drag of the axisymmetric body can be represented by the formula D=Cd.q-S, where Cd is the drag coefficient, q is the dynamic pressure and S is the characteristic area. The characteristic measure of the axisymmetric body of the PST may be taken as the area of its mid-section $S=\pi 2/4$, where d is the diameter of the mid-section. Thus, if the axisymmetric body of the proposed PST were to be geometrically similar to the axisymmetric body of the PST prototype (that is to say given the preservation of the same magnitude of Cd), the drag of the axisymmetric body of the proposed PST would be reduced by about 45% given the same dynamic pressures (that is to say given the same magnitude of the speed V and Mach number M) as a result of the reduction in the diameter d by 25% (see item 2 above). However, since the form of the axisymmetric body of the proposed PST does not have additional steps (conical part with subsequent swelling of the diameter, as in the case of the PST prototype), it will not exhibit any separation of flow nor the occurrence of pressure shocks after the conical part. Thus, as estimates show, the magnitude of the drag coefficient for the axisymmetric body of a proposed PST can be reduced by approximately 7–10%. As a result, the drag of the axisymmetric body X of the proposed PST is about 50% of the PST prototype.

Figure 20:
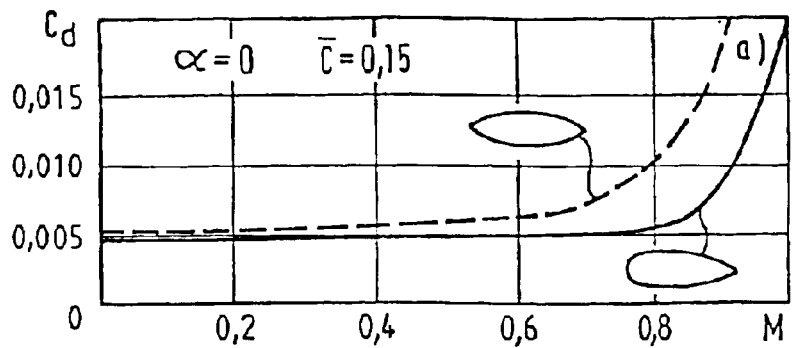
FIGS. 20–23 are diagrams showing examples of the dependence of the drag coefficients Cd of lens-shaped and subsonic aerodynamic profile without a base cut and with a base cut for different values of the angle of attack, Mach numbers M and maximum relative thickness of the profile C/B, where C is the maximum thickness and B the profile chord.
Figure 21:
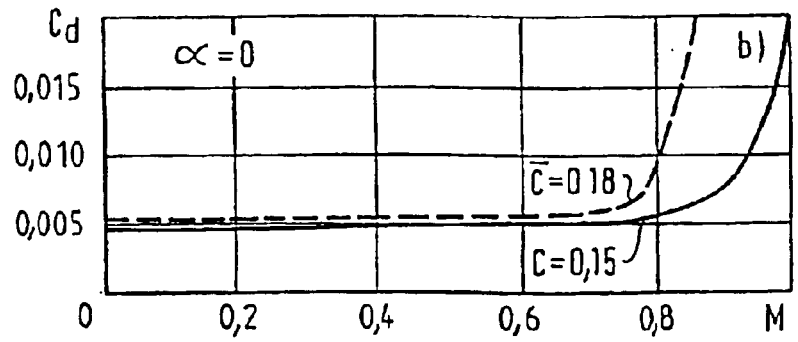

Owing to the fact that the strut of the proposed PST is constructed in such a way that its cross-sections normal to the leading edge (FIGS. 1–3) have the form of a subsonic aerodynamic profile with the rounded-off nose, in particular an aerodynamic profile according to the given invention, and not of a lens-shaped profile, as in the PST prototype, the aerodynamic drag of such a profile for numbers of M=0.8–0.9 can, as indicated by calculations (FIG. 20), be reduced by 2–2.5 times: The strut can be constructed with a sweep at the leading and trailing edges in order to postpone, in terms of Mach numbers, the on-set of a crisis (occurrence of pressure shocks) and thereby a reduction in shock drag. However, as a consequence of the fact that the critical Mach number M at which pressure shocks occur is substantially larger for a profile with a specialized subsonic aerodynamic profile with a rounded-off nose than for a lens-shaped profile, the sweep of the strut with the subsonic aerodynamic profile can be made substantially smaller than for the strut with the lens-shaped profile. Calculations indicate that for the number M=0.9 it is possible to reduce the sweep of the strut at the leading edge by 7–10° on the proposed PST by comparison with the PST prototype. When a compressed stream of gas flows around the strut, the component of the velocity V⊥ perpendicular to the trailing edge influences the shock drag (FIG. 24). Consequently, given the preservation of the same internal volumes of the sections of the strut which are required for the lines of the airways and the electric heating anti-icing system, and the same relative thickness of the profile C, which chiefly strongly affects the onset of crisis (FIG. 21), (sharp increase in the shock drag), the area of the lateral surface of the strut can be reduced, which yields a substantial gain in terms of its weight. Calculations and design studies indicate that this reduction in the weight of the strut is roughly 20% for the proposed PST by comparison with the PST prototype.

Figure 22:
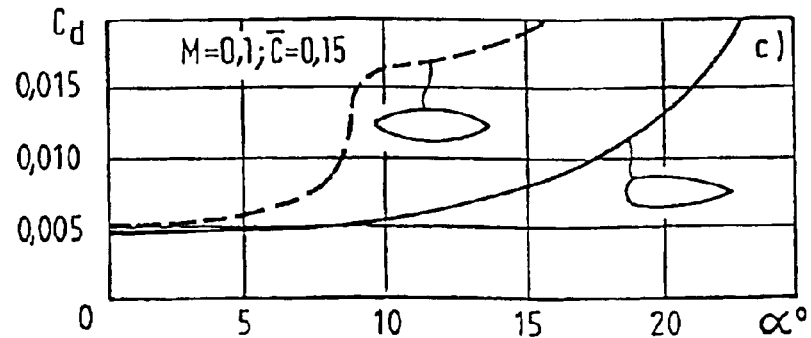
Figure 23:
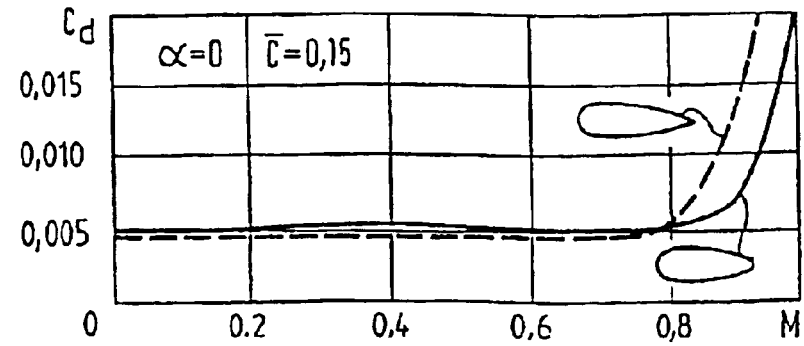

Given an angle of attack, the proposed PST with a strut whose cross-sections have the form of a subsonic aerodynamic profile with a rounded-off nose also has a substantial gain in terms of drag by comparison with the PST prototype having sections of the strut in the form of a lens-shaped profile. Since, given an angle of attack, a flow is realized on the lens-shaped profile with separation of flow from the sharp leading edge, the drag coefficient of such a profile is substantially higher than for the subsonic aerodynamic profile with a rounded-off nose, where a non-separated flow is realized up to comparatively large angles of attack ($\alpha=18°$) and Cd is substantially lower (see FIG. 22, where Cd(a) of such profiles is given, by way of example, for the number M=0.1). The reduction in drag indicated takes place here in the case both of very low and of high Mach numbers.

Figure 4:
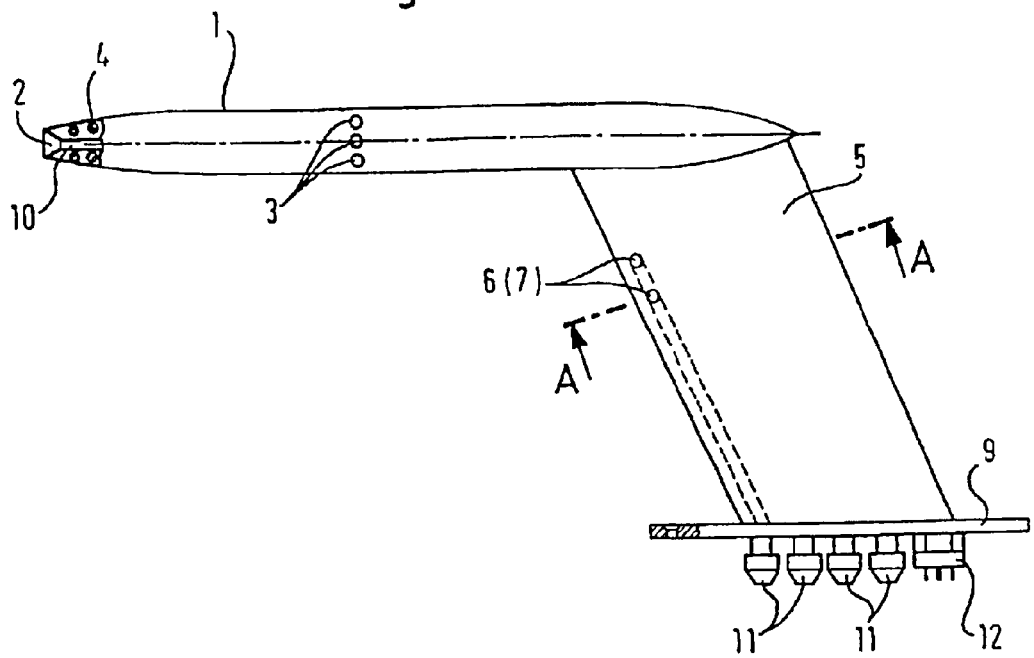
FIG. 4 shows an example of a PST with a strut comprising an aerodynamic profile intended for use at numbers M=0.8–0.9 with a base cut.

The subsonic aerodynamic profile of the strut on the proposed PST is constructed with a base cut to achieve an even greater postponement, in terms of Mach number, of the sharp rise in shock drag (FIGS. 4, 5). As a result of the presence of the base cut on the profile, a smaller diffusor is realized in the area between the maximum relative thickness and the tail part of the profile. In conjunction with an insignificant rise in the base drag, this permits a substantial increase in the critical Mach number for the profile and a postponement of the sharp increase in shock drag at high Mach numbers, and thereby a decrease in the shock drag for large numbers M. The dependencies Cd(M) are presented by way of example in FIG. 9d for the aerodynamic profile without and with a base cut. It is to be seen that, despite a certain slight increase in the base pressure (see, for example, Cd for M=0), in the case of a calculating number M=0.9 the aerodynamic profile with the base cut has a substantially lower drag coefficient than the aerodynamic profile without the base cut. In a fashion analogous to what has been set out above, the strut of the proposed PST can, as a result of the use on it of an aerodynamic profile with a base cut, have a sweep at the trailing edge which is less by 3–5° than the strut of the PST prototype with a lens-shaped profile which, as indicated by the calculations and the design studies carried out, in turn yields a reduction of about 10% in the design weight.

As indicated by the calculations carried out, an additional reduction in the aerodynamic drag coefficient at numbers of M=0.8–0.9 can be obtained by constructing the tail part of the axisymmetric body with a taper and base cut (FIGS. 6, 7). A positive effect—a reduction in the drag coefficient of the axisymmetric body by 10–15%—is also achieved in this case, as for the case described above of the aerodynamic profile with a base cut, owing to the reduction in diffusor effect in the tail part of the axisymmetric body.

An additional reduction in the aerodynamic drag on the proposed PST can be ensured by virtue of the fact that the tail part of the axisymmetric body terminates with and is smoothly joined to the aerodynamic profile of the strut in the area of its maximum relative thickness (FIGS. 8–11). A positive effect is achieved in this case owing to the organization of the underlying interference of the tail part of the axisymmetric body of the PST and strut. Since, in this case, there is no additional diffusor in the area of the joint of the tapering tail part of the axisymmetric body and the tail part of the profile of the strut, success is therefore achieved in avoiding the occurrence of separation of the flow and local pressure shocks. As indicated by estimates, the result is that the drag of the entire PST can be additionally reduced by 10–15%.

4. The required power of the heating anti-icing system of the axisymmetric body of the proposed PST can also be substantially reduced by comparison with the axisymmetric body of the PST prototype. Given the same heat emission of the axisymmetric body and the same temperature of the surface, the required power is proportional to the area of its lateral surface, πdl, that is to say depends linearly on the diameter d of the PST and the length 1. Since in accordance with item 2, the diameter d of the axisymmetric body of the proposed PST can be reduced by 25%, and its length by 20%, the overall reduction in the required power of the anti-icing system is about 40% by comparison with the axisymmetric body of the PST prototype. Together with the reduction in the required power of the anti-icing system of the axisymmetric body of the proposed PST, there is also a substantial reduction in the required power for heating the strut. This is associated with two circumstances. The first is that non-separated flow around the rounded-off nose of the subsonic aerodynamic profile of the strut of the PST is realized on the proposed PST, as a result of which the leading part of the strut of the proposed PST is less subject to icing than the strut of the PST prototype with a lens-shaped profile. Estimates indicate that for this reason the required power for heating the strut can be reduced by 15–20%. The second circumstance is linked to the fact that on the strut of the proposed PST with a subsonic aerodynamic profile with a rounded-off nose the internal volumes permit the electric heating elements to be arranged directly in the nose of the aerodynamic profile, which is most subject to icing (FIGS. 17, 18). There is a substantial curtailment of inefficient thermal losses as a result. The calculations and design studies carried out indicate that for this reason the power required for heating the strut can be reduced further by about 20–25%. Moreover, owing to the reduction, indicated in item 3, in the sweep at the leading edge of the strut of the proposed PST, there is a certain reduction in the extent of the leading strut from its base up to the axisymmetric body, and therefore in the required area of heating. The outcome is a further reduction of approximately 5% in the required power of the anti-icing system. To sum up, the required power of the anti-icing system of the proposed PST is reduced by 40–45% by comparison with the PST prototype.

5. A reduction in weight of the proposed PST is achieved owing to the decreases, indicated in items 2 and 3, in the dimensions of the mid-section of the axisymmetric body and in the area of the lateral surface of the strut as a consequence of lending the latter a lesser sweep. Moreover, decreasing the required power of the electric heating elements (see item 4) also leads to a decrease in the extent of the electric heating elements and in their mass. As shown by the calculations and design studies carried out, the design weight of the proposed PST can be reduced by 25–30% by comparison with the prototype owing to the circumstances indicated.

6. The increase in accuracy of the measurement of the angle of attack on the proposed PST by comparison with the PST prototype is achieved as a result of the fact that the orifices for tapping pressures, by means of which the angle of attack is determined, are arranged on the strut, which has cross-sections in the form of a subsonic aerodynamic profile, at a distance from the nose of the profile up to its maximum thickness, and not on the conical part of the axisymmetric body. It is clear from the dependencies, presented in FIG. 11, of the angular coefficient $æ_\alpha(\alpha)$, obtained on the basis of experimental data, that the derivative $$\frac{\partial æ_\alpha}{\partial a}$$

for the orifices on the aerodynamic profile in the range of angles of attack of a=0–20% is substantially (8 times) higher than for the orifices arranged on the conical surface of the axisymmetric body of the PST prototype. The error in the determination of the angle of attack can be written in the form $$\delta\alpha = \frac{\partial a}{\partial æ_a} \cdot \delta p/q$$

where q is the dynamic pressure and δp is the error in the measurement of the pressure drop P7-P6. Thus, given an error in the real pressure transducers of p=0.15 mm mercury column for M=0.2, the error in measurement of the angle of attack on the proposed PST has a magnitude of 0.05° in the indicated range of the angles of attack, while the figure for the PST prototype is 0.4°. Thus, the accuracy of determination of the angle of attack for the proposed PST is increased by 8 times. An additional increase in the accuracy of measurement of the angle of attack can be achieved by applying an asymmetric aerodynamic profile of the strut (FIG. 26).

Figure 31A:
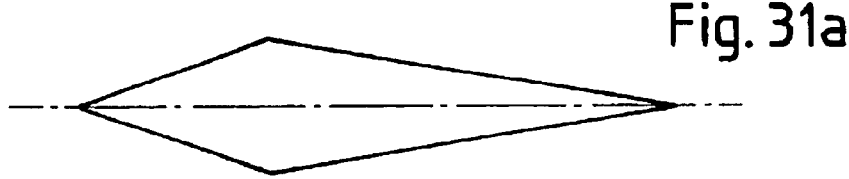
Figure 31B:
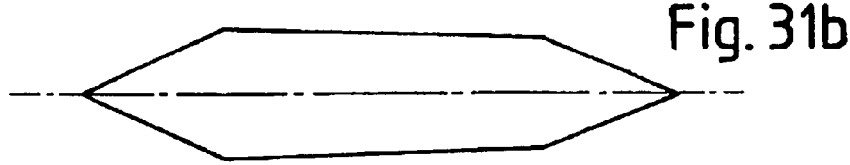
Figure 31C:
Figure 31D:

FIGS. 31a to 31g are showing schematic cross-sectional views of variants of the strut of the PST. As can be seen FIGS. 31a–31c are polygonal strut profiles with a tapered nose, which advantageously may be applied for supersonic airflow. FIG. 31d shows a strut with a tapered nose but curved contours.

Figure 31E:
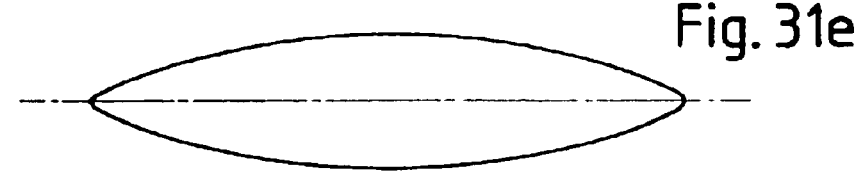
Figure 31F:
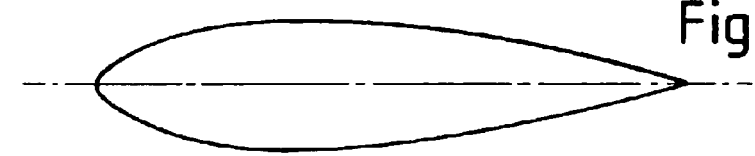
Figure 31G:
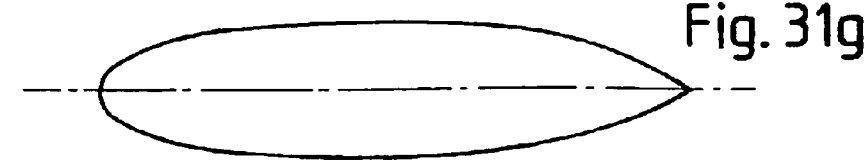

FIGS. 31e to 31g are showing cross sections of the strut with rounded-off nose. FIG. 31f shows the NACA 0015 profile. FIG. 31g is the optimized strut cross section according to FIG. 5.

Thus, the results presented here of computational and experimental research and design studies clearly show advantages in terms of all the parameters indicated above and of the properties of the proposed PST by comparison with the PST prototype.

What is claimed is:

1. Fuselage pitot-static tube having a body and a strut, and comprising orifices for determining total pressure, static pressure and angle of attack, and wherein the orifices for determining the angle of attack are arranged on the strut.

2. The fuselage pitot-static tube of claim 1 in which the strut having a cross-section constructed in the form of a subsonic aerodynamic profile with a rounded-off or tapered nose.

3. Fuselage Pitot-static tube according to claim 2, in which the aerodynamic profile of the strut is asymmetric.

4. Fuselage Pitot-static tube according to claim 2, in which the aerodynamic profile of the strut has a chord of length B, a rounded-off leading edge, a sharpened or blunted trailing edge, which are arranged at the ends of the profile chord and interconnected by the smooth lines of the upper and lower parts of a profile contour, wherein the leading edge of the profile has a radius of curvature of the points of the upper and lower parts of the contour Rc which is in the range of Rc=0.03*B–0.034*B, wherein the maximum relative thickness of the profile C is in the range of C=0.146–0.156 and is arranged at a distance of X=0.3*B–0.6*B, measured from the leading edge of the profile along its chord, and wherein the ordinates, referred to the length of the profile chord, of the points of the upper part of the contour Yu/B and of the lower part of the contour Yl/B, which are arranged at relative distances X/B, measured from the leading edge of the profile along its chord, are in the ranges set forth below:

| X/B | Yu/B | −Yl/B |
|---|---|---|
| 0.0000 | 0.0000 | 0.0000 |
| 0.0333 | 0.0346–0.0376 | 0.0346–0.0376 |
| 0.0640 | 0.0477–0.0507 | 0.0477–0.0507 |
| 0.1044 | 0.0570–0.0600 | 0.0570–0.0600 |
| 0.2171 | 0.0690–0.0730 | 0.0690–0.0730 |
| 0.3242 | 0.0725–0.0765 | 0.0725–0.0765 |
| 0.4013 | 0.0739–0.0779 | 0.0739–0.0779 |
| 0.5204 | 0.0736–0.0776 | 0.0736–0.0776 |
| 0.5992 | 0.0721–0.0761 | 0.0721–0.0761 |
| 0.7105 | 0.0681–0.0721 | 0.0681–0.0721 |
| 0.8067 | 0.0602–0.0642 | 0.0602–0.0642 |
| 0.8603 | 0.0510–0.0550 | 0.0510–0.0550 |
| 0.9464 | 0.0248–0.0288 | 0.0248–0.0288 |
| 1.0000 | 0.0000–0.0160 | 0.0000–0.0160 |

5. Fuselage Pitot-static tube according to claim 4, of which the profile contour has a smoothly changing curvature, wherein the radius of curvature of the upper and lower parts of the profile contour increases smoothly along the profile chord with increasing distance X from the rounded-off leading edge up to the values of X=0.3*B–0.6*B for which part of the contour has a virtually rectilinear form up to the values of R=5.5*B–15. *B, it being the case that distance Yu, measured from the profile chord along the normal thereto upwards to the upper part of the profile contour, increases smoothly to its maximum value of Yumax=0.074*B=0.078*B, the distance Yu further decreases smoothly along the direction towards the trailing edge, the radius of curvature firstly decreases smoothly down to the values of R=0.6*B–1. *B for X=0.82*B–0.9*B, and thereafter it increases smoothly up to the values of X=0.92*B–0.95*B, where the convex part of the contour is joined smoothly to its concave part and, further, the radius of curvature of the concave part of the contour decreases smoothly, reaching at the trailing edge of the profile values of R=0.05*B–0.5*B, the angle between the tangent to the profile contour and the profile chord at its trailing edge being 3–6 degrees for X=B and the lower part of the contour being symmetrical to the upper part relative to the profile chord.

6. Fuselage Pitot-static tube according to claim 4, wherein the dimensionless coordinates, referred to its chord, of the contours of its upper Yu/B and lower Yi/B surfaces differ from the corresponding dimensionless coordinates of the profile by constant equal numerical factors Ku for the upper surface and Kl for the lower surface, and the dimensionless radii of curvature, referred to the profile chord, of the leading edge of this profile for its upper Ru/B and lower Rl/B surfaces differ from the corresponding dimensionless radii of curvature of the leasing edge for the upper and lower surfaces of the profile by the squares of just three constant numerical factors, the numerical values of these factors being in the ranges $0.8<Ku<1.07$ and $0.8<Kl<1.07$.

7. Fuselage pitot-static tube of claim 2, in which the orifices for determining the angle of attache are arranged on the strut at a position between the nose and the region of maximum thickness of the aerodynamic profile of the strut.

8. The fuselage pitot-static tube of claim 1 in which an anti-icing system having airways and electric heating elements is arranged inside the strut such that the electric heating elements are displaced towards a leading edge of the strut.

9. The fuselage pitot-static tube of claim 1 in which the orifices for determining total pressure and static pressure are arranged on the body.

10. The fuselage pitot-static tube of claim 1 in which the body is axisymmetric.

11. The fuselage pitot-static tube of claim 10 in which the orifices for determining total pressure and static pressure are arranged on the axisymmetric body.

12. Fuselage Pitot-static tube according to claim 10, in which the axisymmetric body has a tail part with a taper and a base cut.

13. Fuselage Pitot-static tube according to claim 10, in which a tail part of the axisymmetric body terminates with and is smoothly joined to a region of maximum relative thickness of the aerodynamic profile of the strut.

14. Fuselage Pitot-static tube according to claim 10, in which the axisymmetric body comprises a cylindrical part having a swelling on which the orifices for measuring the static pressure are arranged.

15. Fuselage Pitot-static tube according to claim 1, in which the strut has a trailing edge with a base cut.

* * * * *

UNITED STATES PATENT AND TRADEMARK OFFICE
CERTIFICATE OF CORRECTION

PATENT NO.   : 6,901,814 B2
DATED        : June 7, 2005
INVENTOR(S)  : Vozhdaev, Yevgeny Semenovich et al.

It is certified that error appears in the above-identified patent and that said Letters Patent is hereby corrected as shown below:

<u>Title page,</u>
Item [73], Assignees, should read -- Aeropribor Voskhod, Moscow (RU) --.

Signed and Sealed this

Eleventh Day of April, 2006

JON W. DUDAS
*Director of the United States Patent and Trademark Office*